United States Patent
Cai et al.

(10) Patent No.: US 12,002,992 B2
(45) Date of Patent: Jun. 4, 2024

(54) BATTERY, ELECTRICAL DEVICE, AND METHOD AND DEVICE FOR MANUFACTURING BATTERY

(71) Applicant: CONTEMPORARY AMPEREX TECHNOLOGY CO., LIMITED, Ningde (CN)

(72) Inventors: Rulai Cai, Ningde (CN); Liwen Jiang, Ningde (CN); Fuping Luo, Ningde (CN); Tingting Zhu, Ningde (CN); Wumei Fang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 12 days.

(21) Appl. No.: 17/875,174

(22) Filed: Jul. 27, 2022

(65) Prior Publication Data
US 2022/0376360 A1    Nov. 24, 2022

Related U.S. Application Data

(63) Continuation of application No. PCT/CN2021/076290, filed on Feb. 9, 2021.

(51) Int. Cl.
*H01M 50/50*     (2021.01)
*H01M 50/20*     (2021.01)
(Continued)

(52) U.S. Cl.
CPC ....... *H01M 50/503* (2021.01); *H01M 50/213* (2021.01); *H01M 50/516* (2021.01);
(Continued)

(58) Field of Classification Search
CPC . H01M 50/213; H01M 50/548; H01M 50/503
See application file for complete search history.

(56) References Cited

U.S. PATENT DOCUMENTS

| 2016/0190542 A1 | 6/2016 | Sengoku et al. |
| 2018/0047966 A1* | 2/2018 | Sakaguchi .......... H01M 50/213 |
| 2022/0263201 A1 | 8/2022 | Wang et al. |

FOREIGN PATENT DOCUMENTS

| CN | 200969367 Y | 10/2007 |
| CN | 204045655 U | 12/2014 |

(Continued)

OTHER PUBLICATIONS

International Search Report and Written Opinion, PCT/CN2021/076290, Nov. 1, 2021, 9 pgs.

(Continued)

*Primary Examiner* — Ula C Ruddock
*Assistant Examiner* — Frank A Chernow
(74) *Attorney, Agent, or Firm* — XSENSUS LLP

(57) ABSTRACT

This application discloses a battery, an electrical device, and a method and device for manufacturing a battery. The battery includes: a plurality of battery cells arranged along a first direction, where electrode terminals are disposed on two end faces of each of the battery cells along the first direction respectively; and a busbar component, configured to connect the two electrode terminals to implement electrical connection between two battery cells. The busbar component includes a flexible bend portion. The flexible bend portion is configured to adjust a relative position between the two electrode terminals. A maximum width of the flexible bend portion along the first direction is greater than a distance between the two electrode terminals. The flexible bend portion disposed in the busbar component can be bent in various forms to meet a requirement of electrically connecting the two battery cells arranged at a variety of relative positions.

16 Claims, 10 Drawing Sheets

(51) Int. Cl.
*H01M 50/213* (2021.01)
*H01M 50/503* (2021.01)
*H01M 50/516* (2021.01)
*H01M 50/526* (2021.01)
*H01M 50/548* (2021.01)

(52) U.S. Cl.
CPC ....... *H01M 50/526* (2021.01); *H01M 50/548* (2021.01); *H01M 2220/20* (2013.01)

(56) References Cited

FOREIGN PATENT DOCUMENTS

| | | |
|---|---|---|
| CN | 209804791 U | 12/2019 |
| CN | 112310575 A | 2/2021 |
| EP | 2 950 366 A1 | 12/2015 |
| EP | 3 032 612 A1 | 6/2016 |
| JP | 2004119043 A | 4/2004 |
| JP | 2008251352 A | 10/2008 |
| JP | 2011-86791 A | 4/2011 |

OTHER PUBLICATIONS

Extended European Search Report issued May 12, 2023, in corresponding European Patent Application No. 21908094.2, 7pp.

* cited by examiner

BATTERY, ELECTRICAL DEVICE, AND METHOD AND DEVICE FOR MANUFACTURING BATTERY

CROSS-REFERENCE TO RELATED APPLICATIONS

This application is a continuation application of PCT Patent Application No. PCT/CN2021/076290, entitled "BATTERY, ELECTRICAL DEVICE, AND METHOD AND DEVICE FOR MANUFACTURING BATTERY" filed on Feb. 9, 2021, which is incorporated herein by reference in its entirety.

TECHNICAL FIELD

This application relates to the field of batteries, and in particular, to a battery, an electrical device, and a method and device for manufacturing a battery.

BACKGROUND

A chemical cell, electrochemical cell, or electrochemical battery is a type of device that converts chemical energy of positive and negative active materials into electrical energy through a redox reaction. Different from an ordinary redox reaction, the oxidation and reduction reactions in the electrochemical cell occur separately. To be specific, the oxidation occurs at a negative electrode, the reduction occurs at the positive electrode, and electrons are gained and lost through an external circuit, thereby forming a current. That is an essential feature of all batteries. After being researched and developed in a long term, the chemical batteries have been shaping up into many different varieties applied widely. The batteries are applicable to huge equipment that occupies a building and small devices that are several millimeters in size. The development of modern electronic technology has imposed high requirements on the chemical batteries. Every breakthrough in the technology of chemical batteries has brought about a revolutionary development of electronic devices. Many electrochemical scientists in the world have concentrated their research and development interests in the field of chemical batteries that provide power for electric vehicles.

Due to advantages such as a small size, a high energy density, a high power density, reusability for many cycles, and a long shelf life, lithium-ion batteries as a type of chemical battery are widely used in electronic devices, electrical means of transport, electrical toys, and electrical devices. For example, currently, the lithium-ion batteries are widely used in products such as a mobile phone, a notebook computer, an electric power cart, an electric vehicle, an electric airplane, an electric ship, an electric toy car, an electric toy ship, an electric toy airplane, and a power tool. With the ongoing development of lithium-ion battery technology, higher requirements have been imposed on the performance of lithium-ion batteries. The lithium-ion batteries are expected to meet a plurality of design requirements concurrently. Generally, battery cells in a lithium-ion battery are connected by an electrical connection structure by welding, and the electrical connection structure is a busbar component of relatively high rigidity. After the battery cells are connected by welding, relative positions between the battery cells are not adjustable or changeable, and are unable to adapt to internal mounting space requirements of different vehicles, thereby bringing difficulties to vehicle assembling and reducing production efficiency.

SUMMARY

This application discloses a battery, an electrical device, and a method and device for manufacturing a battery to implement adjustability of a relative position between battery cells.

According to a first aspect of this application, a battery is provided, including:

a plurality of battery cells arranged along a first direction, where electrode terminals are disposed on two end faces of each of the battery cells along the first direction respectively; and a busbar component, configured to connect the two electrode terminals to implement electrical connection between two battery cells, where, the busbar component includes a flexible bend portion, the flexible bend portion is configured to adjust a relative position between the two electrode terminals, and a maximum width of the flexible bend portion along the first direction is greater than a distance between the two electrode terminals.

The flexible bend portion is disposed in the busbar component, and the flexible bend portion is of relatively low rigidity and reserves a deformation margin, and therefore, can be bent in various forms to meet the requirement of electrically connecting the two battery cells arranged at a variety of relative positions. Both the distance and the angle between the two battery cells can be adjusted through the flexible bend portion, thereby quickly adapting to internal mounting space requirements of different vehicles, increasing the number of battery cells in the battery, and increasing the capacity of the battery in the vehicle.

In some embodiments, the maximum width of the flexible bend portion along the first direction is less than a distance between two adjacent end faces of the two battery cells.

The end faces of some types of battery cells are conductive. Therefore, if the flexible bend portion is in contact with the end faces of the battery cells, the contact is unsteady and is prone to generate a contact resistance, thereby affecting conductivity between the battery cells. By limiting the maximum width of the flexible bend portion, the contact is avoided between the flexible bend portion and the end face of the battery cell. Therefore, the contact resistance is avoided, and conductivity is ensured between the battery cells.

In some embodiments, the busbar component is configured to be bent through the flexible bend portion so that the two electrode terminals are disposed opposite to each other along the first direction.

To facilitate welding of the busbar component, the battery cells may be arranged first in such way that axes of the battery cells are parallel to each other. Weld faces of the electrode terminals may be regarded as being on the same plane. In this case, it is easy to weld the busbar component onto the electrode terminals of the two battery cells. After completion of the welding, the two battery cells are folded until the two electrode terminals are disposed opposite to each other along the first direction. In this way, the battery cells are disposed opposite to each other along the first direction. The busbar component is bent through the flexible bend portion during the folding.

In some embodiments, the flexible bend portion protrudes from a gap between the two electrode terminals along a second direction. The second direction is perpendicular to the first direction.

If disposed in the gap between the two electrode terminals, the flexible bend portion is also in unsteady contact with the electrode terminals, and is prone to generate a contact resistance, thereby affecting conductivity between the battery cells. By limiting a protrusion direction of the flexible bend portion, the contact is avoided between the flexible bend portion and the electrode terminal. Therefore, the contact resistance is avoided, and conductivity is ensured between the battery cells.

In some embodiments, the flexible bend portion does not protrude beyond an outer periphery of the battery cell along the second direction.

A plurality of battery cells are disposed in the battery, and the plurality of battery cells are in close contact with each other along the second direction. Therefore, if protruding beyond the outer periphery of the battery cell, the flexible bend portion will extend to a space between other battery cells, resulting in a false circuit connection. In a severe circumstance, the false circuit connection damages the battery cell. With the flexible bend portion limited to a position inside the outer periphery of the battery cell, false circuit connections are avoided.

In some embodiments, the busbar component includes:
a first connecting portion, configured to fixedly connect to an electrode terminal of one of the two battery cells; and
a second connecting portion, configured to fixedly connect to an electrode terminal of the other of the two battery cells.

The flexible bend portion is configured to connect the first connecting portion and the second connecting portion.

By configuring the busbar component to include three portions that serve different functions, it is convenient to design and manufacture the busbar component and fixedly connect the busbar component and the battery cell.

In some embodiments, the flexible bend portion includes a plurality of conductor strips stacked in layers. The first connecting portion and the second connecting portion each include a conductor plate. Two ends of each conductor strip are fixedly connected to the conductor plate separately.

The busbar component is necessarily made of a conductor material. First, the conductor strip is electrically conductive. Further, due to a small thickness and a low rigidity, the conductor strip is easy to bend. After the conductor strips combine into a flexible bend portion, the flexible bend portion are easily bendable. However, a connection structure of the busbar component and the electrode terminal needs to keep rigid to some extent. If the connection structure is not rigid enough, the connection will be unsteady. Due to a large thickness and a high rigidity, the conductor plate meets the requirement of fixedly connecting the busbar component and the electrode terminal.

In some embodiments, a ratio of a thickness of the conductor strip to a thickness of the conductor plate is 1/25 to 1/5.

If the thickness is smaller, the conductor strip is less rigid, and the flexible bend portion formed by combining the conductor strips is more bendable. The conductor strip of an appropriate thickness may be selected according to design requirements. The thickness of the conductor plate may be selected according to flow passage performance of the busbar component, so as to achieve the required passage area.

In some embodiments, the busbar component includes a plurality of conductor strips stacked in layers. The conductor strips of a preset length at two ends of the busbar component fit closely with each other to form the first connecting portion and the second connecting portion respectively. The conductor strips at middle positions of the busbar component fit closely with each other to form the flexible bend portion.

Alternatively, the busbar component may be integrally made of the conductor strips. The close fitting of the conductor strips can not only meet the bending requirement of the flexible bend portion, but also meet the requirement of fixedly connection between the busbar component and the electrode terminal, making it more convenient to manufacture the busbar component.

In some embodiments, the flexible bend portion includes:
an arc portion, located at a middle position of the flexible bend portion;
a first guide portion, configured to connect the arc portion and the first connecting portion; and
a second guide portion, configured to connect the arc portion and the second connecting portion.

The first guide portion and the second guide portion are configured to guide the first connecting portion and the second connecting portion respectively to bend in a case that the flexible bend portion is bent.

The flexible bend portion is subjected to a bending process, and the shape may change after the bending process. Therefore, in order to keep a consistent shape of the flexible bend portion and keep a consistent shape of the busbar component, a guide portion may be disposed at both ends of the flexible bend portion, and the bending process is guided by the guide portion. Therefore, after the bending, the shape of the flexible bend portion keeps consistent, and the shape of the busbar component keeps consistent, thereby ensuring that the structure of the battery meets the design requirements and improving quality of the battery.

In some embodiments, the first guide portion is arc-shaped, and a radius of the first guide portion is not greater than a radius of the arc portion; and/or the second guide portion is arc-shaped, and a radius of the second guide portion is not greater than a radius of the arc portion.

With the guide portion being arc-shaped, the guide portion transitions to the arc portion naturally, thereby improving the guidance effect. The guide portion primarily serves a purpose of guiding the bending. Therefore, the radius of the guide portion may be designed to be relatively small. The deformation of the flexible bend portion is primarily performed through the arc portion. Therefore, the radius of the arc portion may be designed to be relatively large. Definitely, in a deformation process of the flexible bend portion, the guide portion also participates, and serves a function of assisting in the deformation.

In some embodiments, the flexible bend portion is provided with a notch, and the flexible bend portion is configured to be bent through the notch.

The notch may be provided on both sides on top of the flexible bend portion. By reducing the width of the flexible bend portion, the rigidity of the flexible bend portion at the notch is further reduced, and the flexible bend portion is made prone to bend at the notch. The notch made on both sides of the flexible bend portion can also form a fuse. The fuse is configured to blow when the busbar component is overcurrent, so that the first connecting portion is disconnected from the second connecting portion, and the safety performance of the battery is improved.

In some embodiments, a bending degree of the flexible bend portion is adjustable. The flexible bend portion is configured to adjust the relative position between the two electrode terminals by adjusting the bending degree.

When the relative position between two adjacent battery cells changes, the bending degree of the flexible bend portion changes adaptively, so as to meet the requirement of electrically connecting the two battery cells arranged at a variety of relative positions. After a plurality of battery cells are connected, the battery cells do not have to be arranged on one plane, but can be arranged on two intersecting planes, thereby being quickly adaptable to the internal mounting space requirements of different vehicles.

In some embodiments, a cross-sectional shape of the flexible bend portion is an opened circle, an opened rectangle, or an opened ellipse.

Different cross-sectional shapes of the flexible bend portion can be selected according to design requirements. All the cross-sectional shapes can meet the functional requirements of the flexible bend portion, but differ in the deformation margin. The deformation margin is the greatest if the shape is a rectangle, smaller if the shape is an ellipse, and even smaller if the shape is a circle. The busbar components with variously shaped flexible bend portions may be disposed between the battery cells located at different positions, so as to meet the requirement that the flexible bend portions at different positions in the battery can have different shapes.

According to a second aspect of this application, an electrical device is provided. The electrical device includes the battery described in the first aspect above. The battery is configured to provide electrical energy for the electrical device.

According to a third aspect of this application, a method for manufacturing a battery is further provided, including:
providing a plurality of battery cells arranged along a first direction, where electrode terminals are disposed on two end faces of each of the battery cells along the first direction respectively; and
providing a busbar component, where the busbar component is configured to connect the two electrode terminals to implement electrical connection between two battery cells.

The busbar component includes a flexible bend portion, and the flexible bend portion is configured to adjust a relative position between the two electrode terminals. A maximum width of the flexible bend portion along the first direction is greater than a distance between the two electrode terminals.

According to a fourth aspect of this application, a device for manufacturing a battery is further provided, including:
a battery cell manufacturing module, configured to manufacture a plurality of battery cells, where electrode terminals are disposed on two end faces of each of the battery cells along a first direction respectively; and
a busbar component manufacturing module, configured to manufacture a busbar component, where the busbar component is configured to connect the two electrode terminals to implement electrical connection between two battery cells; and
an assembling module, configured to fixedly connect the busbar component to the two electrode terminals.

The busbar component includes a flexible bend portion, and the flexible bend portion is configured to adjust a relative position between the two electrode terminals. A maximum width of the flexible bend portion along the first direction is greater than a distance between the two electrode terminals.

BRIEF DESCRIPTION OF DRAWINGS

The drawings described herein are intended to enable a further understanding of this application, and constitute a part of this application. The exemplary embodiments of this application and the description thereof are intended to explain this application but not to constitute any undue limitation on this application. In the drawings.

Figure 1:
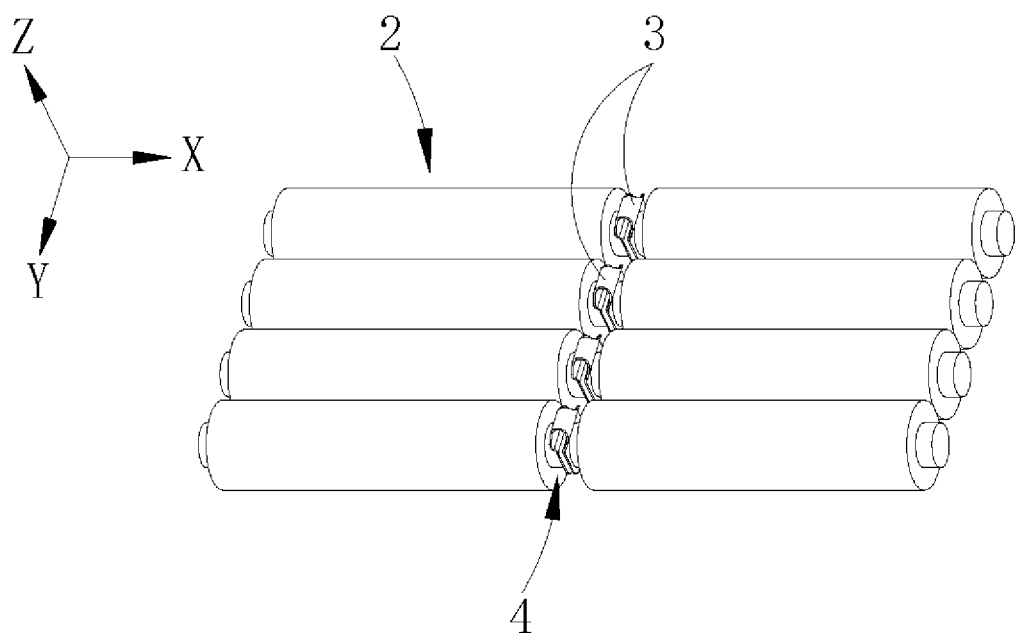
FIG. 1 is a three-dimensional schematic diagram of a battery according to some embodiments of this application.

Reference numerals: 1. vehicle; 10. battery; 30. controller; 40. motor; 2. battery cell; 201. first battery cell; 202. second battery cell; 3. busbar component; 301. first connecting portion; 302. second connecting portion; 303. flexible bend portion; 3031. arc portion; 3032. first guide portion; 3033. second guide portion; 304. notch; 4. electrode terminal; 401. first electrode terminal; 402. second electrode terminal; 5. device for manufacturing a battery; 501. battery cell manufacturing module; 502. busbar component manufacturing module; 503. assembling module.

DETAILED DESCRIPTION OF EMBODIMENTS

To make the objectives, technical solutions, and advantages of this application clearer, the following gives an explicit and thorough description of the technical solutions in the embodiments of this application with reference to the drawings in the embodiments of this application. Understandably, the described embodiments are merely a part of but not all of the embodiments of this application. All other embodiments derived by a person of ordinary skill in the art based on the embodiments described herein without making any creative effort fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application. The terms "include", "comprise", "possess", "contain", and any variations thereof used in the specification, claims, and brief description of drawings hereof are used in a non-restrictive way. Therefore, a method or device that "includes", "comprises", or "contains" one or more steps or elements, includes but is not limited to, the one or more steps or elements enumerated. The terms such as "first" and "second" used in the specification, claims, and brief description of drawings herein are intended to distinguish between different items, but are not intended to describe a specific sequence or order of precedence. In addition, the terms "first" and "second" are used merely for descriptive purposes but are not to be construed as indicating or implying relative importance or implicitly specifying the quantity of technical features indicated. Therefore, a feature qualified by "first", "second" and the like may explicitly or implicitly include one or more such features. In the description of this application, unless otherwise specified, "a plurality of" means two or more.

Understandably, in the description of this application, a direction or a positional relationship indicated by the terms such as "center", "transverse", "length", "width", "up", "down", "before", "after", "left", "right", "vertical", "horizontal", "top", "bottom", "in", "out", "axial", "radial", and "circumferential" is a direction or positional relationship based on the illustration in the drawings, and is merely intended for ease or brevity of description of this application, but not intended to indicate or imply that the indicated device or element must be located in the specified direction or constructed or operated in the specified direction. Therefore, such terms are not to be understood as a limitation on this application.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

As mentioned above, it needs to be emphasized that the term "include/comprise" used in this specification is intended to explicitly indicate the existence of the mentioned feature, integer, step or component, but does not exclude the existence or addition of one or more other features, integers, steps, or components, or a group of features, integers, steps, or components. Unless otherwise expressly specified herein, a noun in the singular form preceded by "a", "an", or "the" herein includes the plural form thereof.

The terms "a" and "an" in this specification may mean one, but may also have the same meaning as "at least one" or "one or more". The term "approximately" qualifying a numerical value generally means the numerical value plus or minus 10% thereof, or more specifically, plus or minus 5% thereof. Unless expressly indicating only an alternative solution, the term "or" used in the claims means "and/or".

The term "and/or" in this application indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

Batteries mentioned in this field may be classed into a primary battery and a rechargeable battery depending on rechargeability. The primary battery is informally known as a "disposable" battery or a galvanic battery because the battery is not rechargeable and has to be discarded after exhaustion of electrical power. A rechargeable battery is also called a secondary battery, a secondary cell, or a storage battery. A material for and a process of manufacturing a rechargeable battery are different from those of a primary battery. An advantage of the rechargeable battery is that the battery can be used for a plurality of cycles after being charged. An output current load capacity of the rechargeable battery is higher than that of most primary batteries. Currently, common types of rechargeable batteries include: lead-acid battery, nickel-metal hydride battery, and lithium-ion battery. The lithium-ion battery exhibits advantages such as a light weight, a high capacity (the capacity is 1.5 to 2 times that of a nickel-metal hydride battery of the same weight), and no memory effect, and exhibits a very low self-discharge rate. Therefore, despite relative expensiveness, the lithium-ion battery is widely applied. The lithium-ion battery is also applied to battery electric vehicles and hybrid vehicles. The lithium-ion battery for use in such vehicles possesses a relatively low capacity, but a relatively high output current, a relatively high charge current, and a relatively long life in spite of a relatively high cost.

The battery described in the embodiments of this application means a rechargeable battery. The following describes the conception of this application using a lithium-ion battery as an example. Understandably, this application is applicable to any other suitable types of rechargeable batteries. The battery mentioned in the embodiments of this application means a stand-alone physical module that includes one or more battery cells to provide a higher voltage and a higher capacity. For example, the battery mentioned in this application may include a battery module, a battery pack, or the like. A battery cell includes a positive electrode plate, a negative electrode plate, an electrolytic solution, and a separator, and is a basic structural unit of a battery module and a battery pack. Depending on the form of packaging, battery cells are generally classed into three types: cylindrical battery cell, prismatic battery cell, and pouch-type battery cell.

A lithium-ion battery cell works primarily by relying on movement of lithium ions between the positive electrode plate and the negative electrode plate. The lithium-ion battery cell uses an intercalated lithium compound as an electrode material. Currently, positive electrode materials typically used for lithium-ion batteries include: lithium cobalt oxide ($LiCoO_2$), lithium manganese oxide ($LiMn_2O_4$), lithium nickel oxide ($LiNiO_2$), and lithium iron phosphate ($LiFePO_4$). A separator is disposed between the positive electrode plate and the negative electrode plate to form a thin film structure compounded of three layers of materials. The thin film structure is generally wound or stacked to form an electrode assembly of a desired shape. For example, the thin film structure compounded of three layers of materials in a cylindrical battery cell is wound into a cylinder-shaped electrode assembly. The thin film structure in a prismatic battery cell is wound or stacked to form an electrode assembly in the shape of approximately a cuboid.

A plurality of battery cells may be connected together in series and/or parallel through electrode terminals, so as to be applied in various scenarios. In high-power application scenarios such as electric vehicles, a battery is applied in different hierarchical forms such as a battery cell, a battery module, and a battery pack. The battery module is formed by electrically connecting a specific quantity of battery cells together and putting the battery cells into a frame, so as to protect the battery cells from external impact, heat, vibration, and the like. The battery pack is a final state of a battery system mounted in an electric vehicle. Currently, most of battery packs are made by assembling various control and protection systems such as a battery management system (BMS) and a thermal management part on one or more battery modules. With advancement of technologies, the battery module is omissible. That is, a battery pack is directly formed from battery cells. This improvement significantly decreases the quantity of parts while enhancing a gravimetric energy density and a volumetric energy density of the battery system. A battery referred to herein includes a battery module or a battery pack.

Existing battery cells are usually connected to each other by being welded to a busbar component of relatively high rigidity, resulting in the problems of inability to adjust the relative position between the battery cells and difficulty to fully use the internal space of a vehicle for accommodating batteries. In this application, a flexible bend portion is disposed in the busbar component. The flexible bend portion can be bent in various forms. Therefore, the busbar component is deformable, and the distance and angle between two battery cells welded to the busbar component are adjustable, thereby being quickly adaptable to the internal mounting space requirements of different vehicles, facilitating vehicle assembling, and improving production efficiency of vehicles.

For clearer understanding of this application, the following describes the embodiments of this application in detail with reference to FIG. 1 to FIG. 18.

Figure 2:
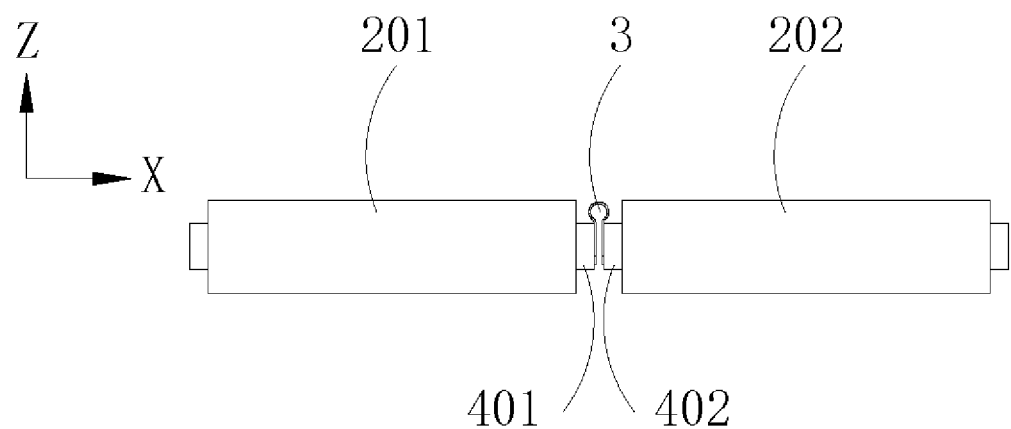
FIG. 2 is a schematic front view of a battery according to some embodiments of this application.
Figure 3:
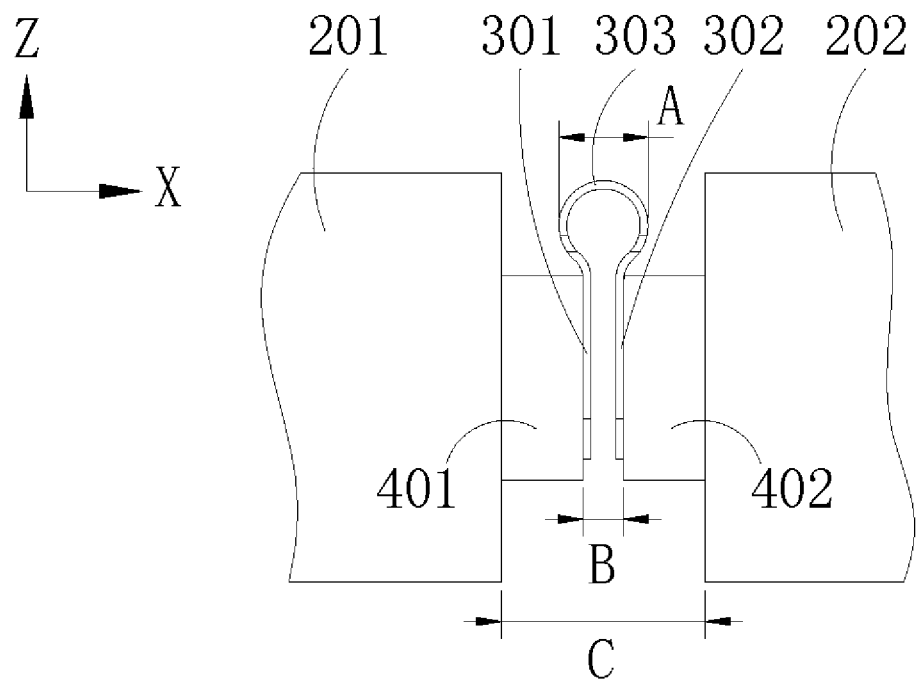
FIG. 3 is a partial enlarged view of the battery shown in FIG. 2.
Figure 4:
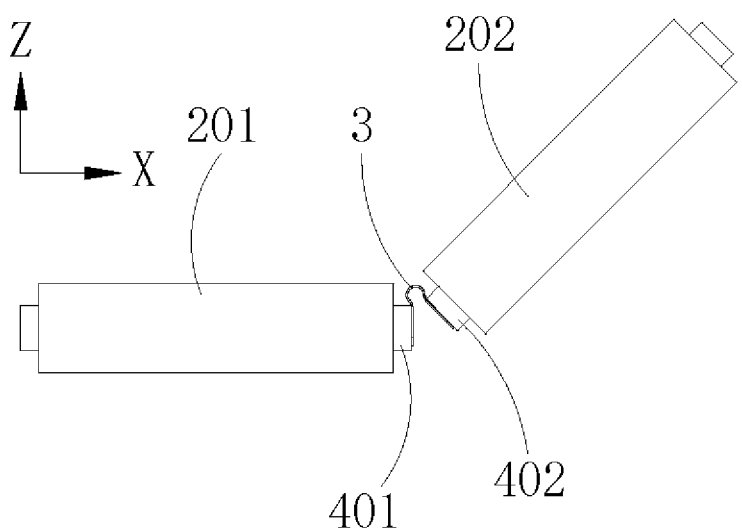
FIG. 4 is a schematic front view of a battery according to some embodiments of this application.
Figure 5:
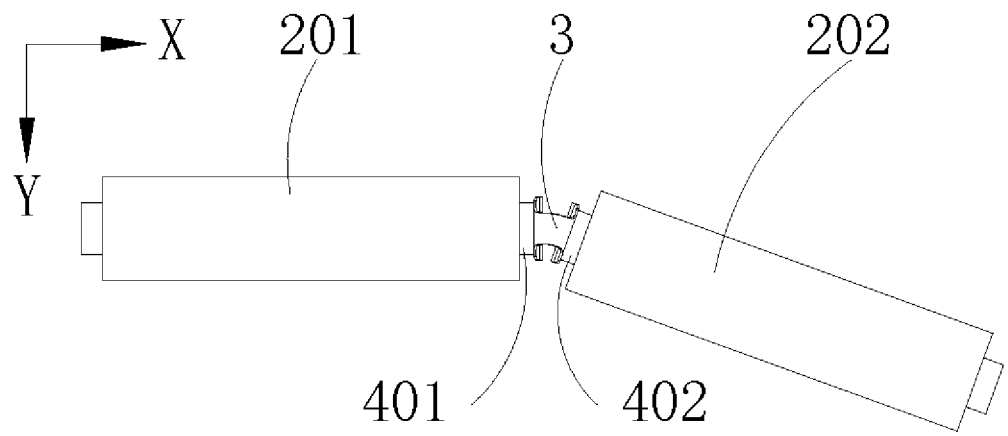
FIG. 5 is a schematic top view of a battery according to some embodiments of this application.

As shown in FIG. 1, FIG. 2, and FIG. 3, a battery 10 according to an embodiment of this application includes:
- a plurality of battery cells 2 arranged along a first direction X, where electrode terminals 4 are disposed on two end faces of each of the battery cells 2 along the first direction X respectively; and
- a busbar component 3, configured to connect the two electrode terminals 4 to implement electrical connection between two battery cells 2.

The busbar component 3 includes a flexible bend portion 303. The flexible bend portion 303 is configured to adjust a relative position between the two electrode terminals 4. A maximum width of the flexible bend portion 303 along the first direction X is greater than a distance between the two electrode terminals 4.

In this embodiment, the first direction X is an axial direction of the battery cell 2 after the battery cell is fixed in the battery 10, or a length direction of the battery cell 2 after the battery cell is fixed in the battery 10.

The battery cell 2 may be in a shape such as a prism or a cylinder. Each electrode terminal 4 may be in a shape such as a cuboid, a cube, or a cylinder. The busbar component 3 in this embodiment is applicable to electrode terminals 4 of such different shapes.

In FIG. 1 and FIG. 2, an example is given in which two rows of battery cells 2 are arranged, that is, a first battery cell 201 and a second battery cell 202. A first electrode terminal 401 and a second electrode terminal 402 are disposed on two end faces along the first direction X respectively. The two battery cells 2 are located at various relative positions. The first battery cell 201 and the second battery cell 202 in FIG. 2 and FIG. 3 may be regarded as being arranged coaxially. The first battery cell 201 and the second battery cell 202 in FIG. 4 may be regarded as being arranged in such a way that the axis of the first battery cell in an XZ plane is at an obtuse angle of less than 180 degrees to the axis of the second battery cell. The first battery cell 201 and the second battery cell 202 in FIG. 5 may be regarded as being arranged in such a way that the axis of the first battery cell in an XY plane is at an obtuse angle of less than 180 degrees to the axis of the second battery cell. In actual use, the relative positions between the battery cells 2 are not limited to the three examples above, and may be other diversified relative positions.

As shown in FIG. 3, a maximum width of the flexible bend portion 303 is A. A is a maximum dimension of an outer contour of the flexible bend portion 303 along the first direction X. A distance between the first electrode terminal 401 and the second electrode terminal 402 is B. B is a gap distance between an end face of the first electrode terminal and an end face of the second electrode terminal along the first direction X. In this embodiment, A is greater than B, so that the flexible bend portion 303 reserves a relatively large deformation margin.

The flexible bend portion 303 is disposed in the busbar component 3, and the flexible bend portion 303 is of relatively low rigidity and reserves a deformation margin, and therefore, can be bent in various forms to meet the requirement of electrically connecting the two battery cells 2 arranged at a variety of relative positions. Both the distance and the angle between the two battery cells 2 can be adjusted through the flexible bend portion 303, thereby quickly adapting to internal mounting space requirements of different vehicles, increasing the number of battery cells 2 in the battery 10, and increasing the capacity of the battery 10 in the vehicle.

In some embodiments, the maximum width of the flexible bend portion 303 along the first direction X is less than a distance between two adjacent end faces of the two battery cells 2.

As shown in FIG. 3, a maximum width of the flexible bend portion 303 is A. A is a maximum dimension of an outer contour of the flexible bend portion 303 along the first direction X. A distance between end faces of the first battery cell 201 and the second battery cell 202 is C. C is a gap distance between the end faces of the first battery cell and the second battery cell along the first direction X. In this embodiment, A is less than C, so that the flexible bend portion 303 is not in contact with the end face of the battery cell 2.

The end faces of some types of battery cells 2 are conductive. Therefore, if the flexible bend portion 303 is in contact with the end face of the battery cells 2, the contact is unsteady and is prone to generate a contact resistance, thereby affecting the conductivity between the battery cells 2. By limiting the maximum width of the flexible bend portion 303, the contact is avoided between the flexible bend portion 303 and the end face of the battery cell 2. Therefore, the contact resistance is avoided, and conductivity is ensured between the battery cells 2.

In some embodiments, the flexible bend portion 303 protrudes from a gap between the two electrode terminals 4 along a second direction Z. The second direction Z is perpendicular to the first direction X.

As shown in FIG. 3, the second direction Z may be regarded as being perpendicular to the axial direction or length direction of the first battery cell 201 and the second battery cell 202. The flexible bend portion 303 protrudes from the gap between the first electrode terminal 401 and the second electrode terminal 402 along the second direction Z.

If disposed in the gap between the two electrode terminals 4, the flexible bend portion 303 is also in unsteady contact with the electrode terminals 4, and is prone to generate a contact resistance, thereby affecting conductivity between the battery cells 2. By limiting a protrusion direction of the flexible bend portion 303, the contact is avoided between the flexible bend portion 303 and the electrode terminal 4. Therefore, the contact resistance is avoided, and conductivity is ensured between the battery cells 2.

In some embodiments, the flexible bend portion 303 does not protrude beyond an outer periphery of the battery cell 2 along the second direction Z.

As shown in FIG. 3, the flexible bend portion 303 does not protrude beyond outer peripheries of the first battery cell 201 and the second battery cell 202 along the second direction Z. The top of the flexible bend portion 303 along the second direction Z may be flush with the outer peripheries of the first battery cell 201 and the second battery cell 202, or lower than the outer peripheries of the first battery cell 201 and the second battery cell 202.

A plurality of battery cells 2 are disposed in the battery 10, and the plurality of battery cells 2 are in close contact with each other along the second direction Z. Therefore, if protruding beyond the outer periphery of the battery cell 2, the flexible bend portion 303 will extend to a space between other battery cells 2, resulting in a false circuit connection. In a severe circumstance, the false circuit connection damages the battery cell 2. With the flexible bend portion 303 limited to a position inside the outer periphery of the battery cell 2, false circuit connections are effectively avoided.

In some embodiments, the busbar component 3 includes:
a first connecting portion 301, configured to fixedly connect to an electrode terminal 4 of one of the two battery cells 2; and
a second connecting portion 302, configured to fixedly connect to an electrode terminal 4 of the other of the two battery cells 2.

The flexible bend portion 303 is configured to connect the first connecting portion 301 and the second connecting portion 302.

As shown in FIG. 3, the first connecting portion 301 is fixedly connected to the first electrode terminal 401 of the first battery cell 201. The second connecting portion 302 is fixedly connected to the second electrode terminal 402 of the second battery cell 202. The fixed connection may be implemented by welding, such as laser welding, ultrasonic welding, or by other applicable methods of welding.

By configuring the busbar component 3 to include three portions that serve different functions, it is convenient to design and manufacture the busbar component 3 and fixedly connect the busbar component 3 and the battery cell 2.

A positioning hole may be made on the first connecting portion 301 and the second connecting portion 302 separately, where the positioning hole corresponds to a welding position and extends along a thickness direction of the connecting portion. The positioning hole may be a through-hole, and is configured to guide a welding device to locate the welding position during welding.

In some embodiments, a cross-sectional shape of the flexible bend portion 303 is an opened circle, an opened rectangle, or an opened ellipse.

Figure 6:
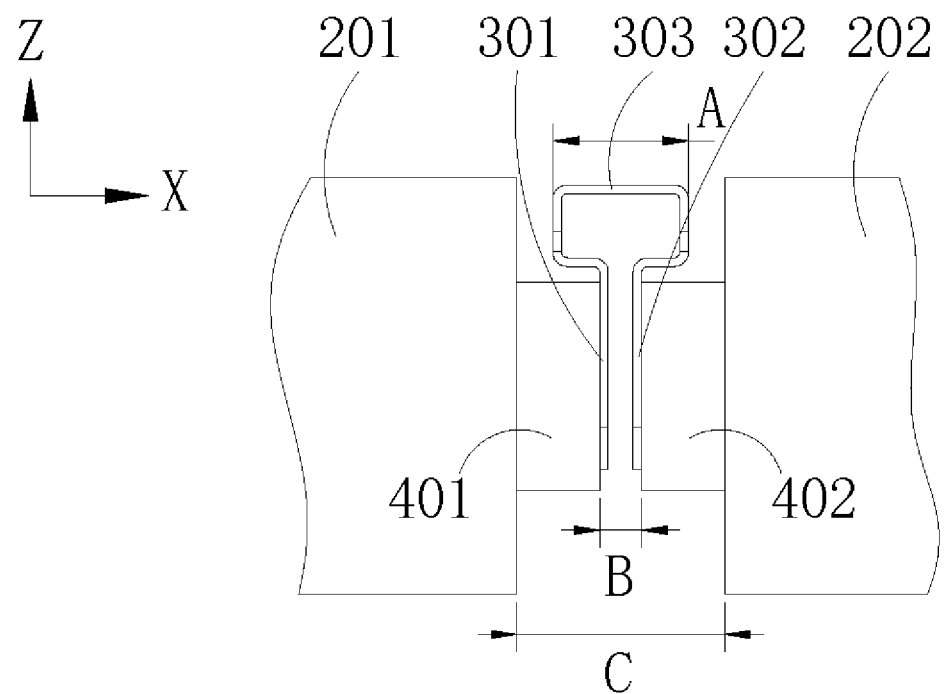
FIG. 6 is a schematic front view of a battery according to some embodiments of this application.
Figure 7:
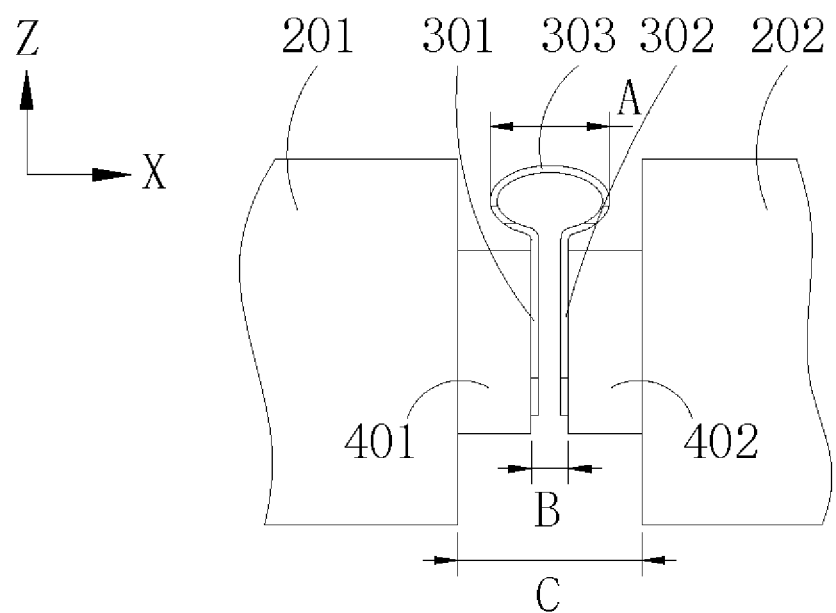
FIG. 7 is a schematic front view of a battery according to some embodiments of this application.
Figure 8:
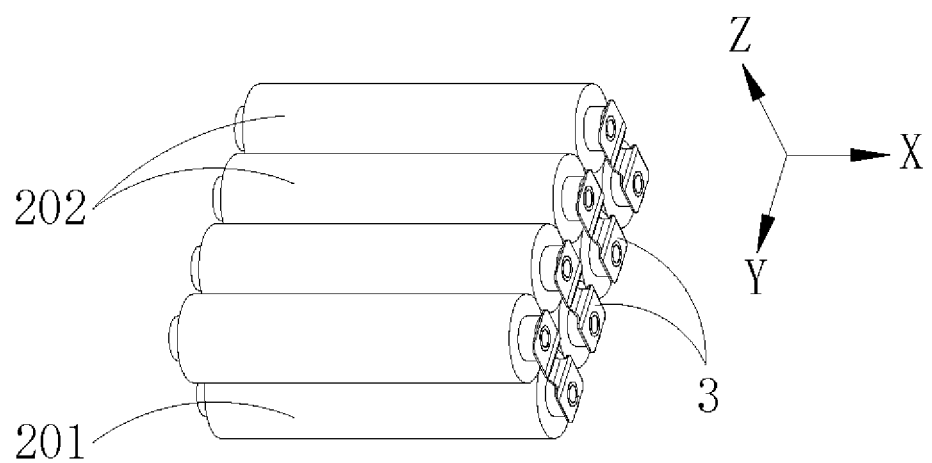
FIG. 8 is a three-dimensional schematic diagram of a battery in a case of electrical connection according to some embodiments of this application.
Figure 9:
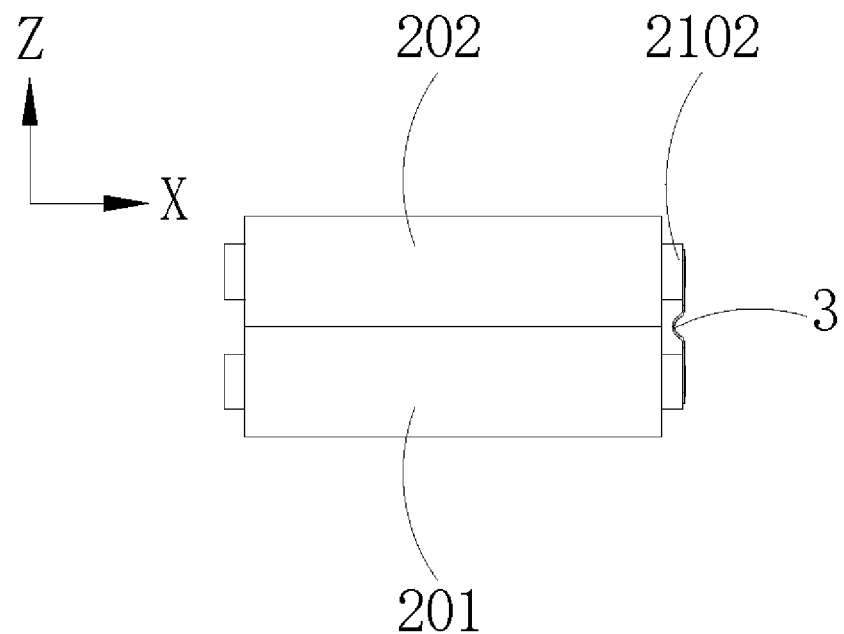
FIG. 9 is a schematic front view of a battery in a case of electrical connection according to some embodiments of this application.
Figure 10:
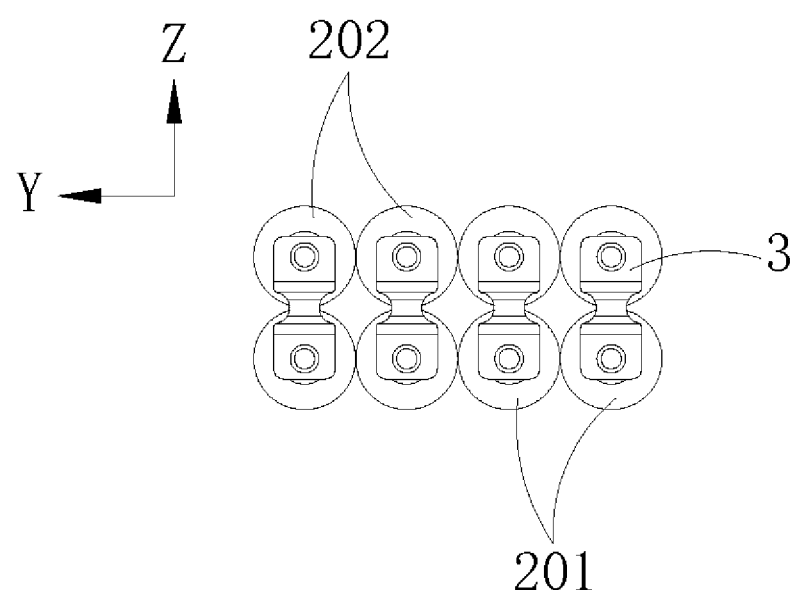
FIG. 10 is a schematic right view of a battery in a case of electrical connection according to some embodiments of this application.
Figure 11:
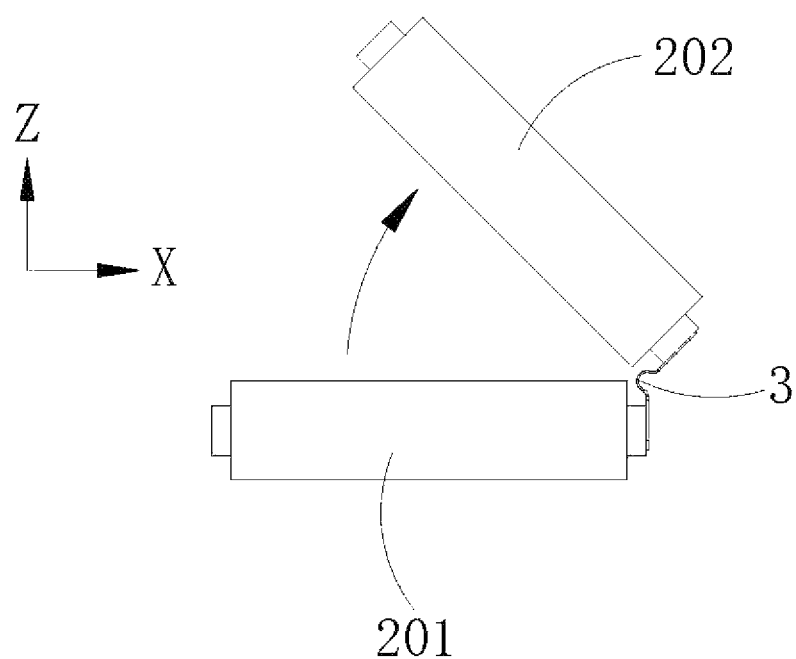
FIG. 11 is a schematic diagram of a battery in an opened state after electrical connection according to some embodiments of this application.

As shown in FIG. 3, the cross-sectional shape of the flexible bend portion 303 is an opened circle. As shown in FIG. 6, the cross-sectional shape of the flexible bend portion 303 is an opened rectangle. As shown in FIG. 7, the cross-sectional shape of the flexible bend portion 303 is an opened ellipse. The shapes may be available as soon as the flexible bend portion 303 is made, or may be formed by bending subsequently.

It needs to be noted, in FIG. 3, the maximum width A of the flexible bend portion 303 is an outer diameter of the flexible bend portion 303 along the first direction X. In FIG. 6, the maximum width A of the flexible bend portion 303 is a rectangular length of the flexible bend portion 303 along the first direction X. In FIG. 7, the maximum width A of the flexible bend portion 303 is an outer diameter of an elliptical flexible bend portion 303 on a longitudinal axis along the first direction X.

Different cross-sectional shapes of the flexible bend portion 303 can be selected according to design requirements. All the cross-sectional shapes can meet the functional requirements of the flexible bend portion 303, but differ in the deformation margin. The deformation margin is the greatest if the shape is a rectangle, smaller if the shape is an ellipse, and even smaller if the shape is a circle. The busbar components 3 with variously shaped flexible bend portions 303 may be disposed between the battery cells 2 located at different positions, so as to meet the requirement that the flexible bend portions 303 at different positions in the battery 10 can have different shapes.

In some embodiments, the busbar component 3 is configured to be bent through the flexible bend portion 303 so that the two electrode terminals 4 are disposed opposite to each other along the first direction X.

As shown in FIG. 8, FIG. 9, FIG. 10, and FIG. 11, in order to facilitate welding of the busbar component 3, the battery cells 2 may be arranged first in such way that axes of the battery cells 2 are parallel to each other. Weld faces of the electrode terminals 4 may be regarded as being on the same plane such as the YZ plane shown in FIG. 8. In this case, it is easy to weld the busbar component 3 onto the electrode terminals 4 of the two battery cells 2. After completion of the welding, the two battery cells 2 are folded until the two electrode terminals 4 are disposed opposite to each other along the first direction X. In this way, the battery cells 2 are disposed opposite to each other along the first direction X. The busbar component 3 is bent through the flexible bend portion 303 during the folding.

In some embodiments, the flexible bend portion 303 includes a plurality of conductor strips stacked in layers. The first connecting portion 301 and the second connecting portion 302 each include a conductor plate. Two ends of each conductor strip are fixedly connected to the conductor plate separately.

Figure 12:
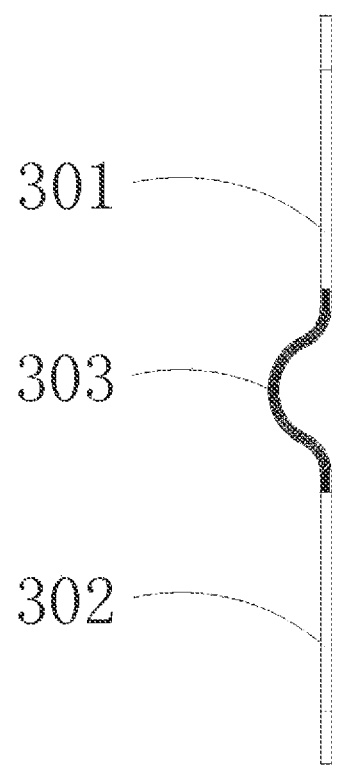
FIG. 12 is a schematic left view of a busbar component according to some embodiments of this application.
Figure 13:
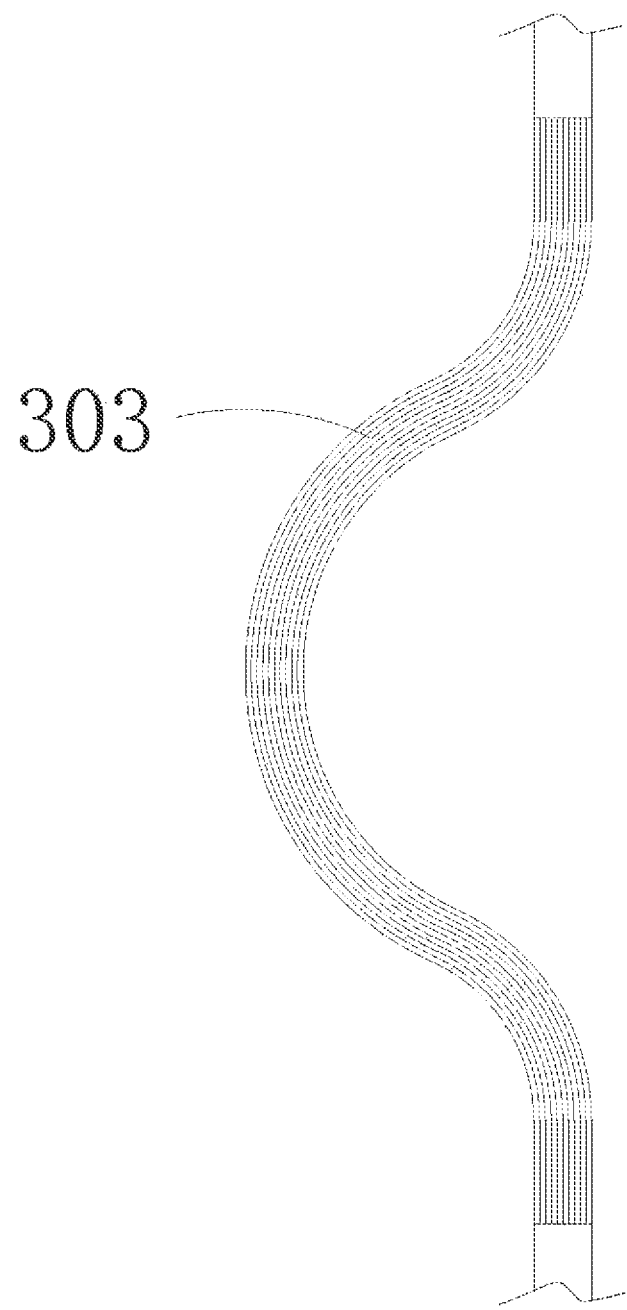
FIG. 13 is a partial enlarged view of the busbar component shown in FIG. 12.

As shown in FIG. 12 and FIG. 13, the busbar component 3 is necessarily made of a conductor material such as aluminum or copper. The conductor strip may be an aluminum or copper strip. First, the conductor strip is electrically conductive. Further, due to a small thickness and a low rigidity, the conductor strip is easy to bend. After the conductor strips combine into a flexible bend portion 303, the flexible bend portion 303 is easily bendable. However, a connection structure of the busbar component 3 and the electrode terminal 4 needs to keep rigid to some extent. If the connection structure is not rigid enough, the connection will be unsteady. Due to a large thickness and a high rigidity, the conductor plate meets the requirement of fixedly connecting the busbar component 3 and the electrode terminal 4. The conductor plate may be an aluminum or copper plate.

In some embodiments, a ratio of a thickness of the conductor strip to a thickness of the conductor plate is 1/25 to 1/5.

If the thickness is smaller, the conductor strip is less rigid, and the flexible bend portion 303 formed by combining the conductor strips is more bendable. The conductor strip of an appropriate thickness may be selected according to design requirements. The thickness of the conductor plate may be selected according to flow passage performance of the busbar component 3, so as to achieve the required passage area. The thickness of the conductor plate may be 1 to 2 mm, and the flexible bend portion 303 includes 2 to 25 layers of conductor strips. For example, the thickness of the conductor plate is 2 mm, and the flexible bend portion 303 includes 20 layers of conductor strips, and therefore, the thickness of each layer of conductor strip is 0.1 mm.

In some embodiments, the busbar component 3 includes a plurality of conductor strips stacked in layers. The conductor strips of a preset length at two ends of the busbar component 3 fit closely with each other to form the first connecting portion 301 and the second connecting portion 302 respectively. The conductor strips at middle positions of the busbar component 3 fit closely with each other to form the flexible bend portion 303.

Alternatively, the busbar component 3 may be integrally made of the conductor strips. The close fitting of the conductor strips can not only meet the bending requirement of the flexible bend portion 303, but also meet the requirement of fixedly connection between the busbar component 3 and the electrode terminal 4, making it more convenient to manufacture the busbar component 3. The conductor strips of a preset length at the two ends of the busbar component 3 may fit closely with each other by welding. The conductor strips are not easily separable during use, but always keep closely fitted together. The conductor strips at the middle positions of the busbar component 3 do not need to be welded, but are closely fitted together naturally.

In some embodiments, the flexible bend portion 303 includes:
  an arc portion 3031, located at a middle position of the flexible bend portion 303;
  a first guide portion 3032, configured to connect the arc portion 3031 and the first connecting portion 301; and
  a second guide portion 3033, configured to connect the arc portion 3031 and the second connecting portion 302.

The first guide portion 3032 and the second guide portion 3033 are configured to guide the first connecting portion 301 and the second connecting portion 302 respectively to bend in a case that the flexible bend portion 303 is bent.

Figure 14:
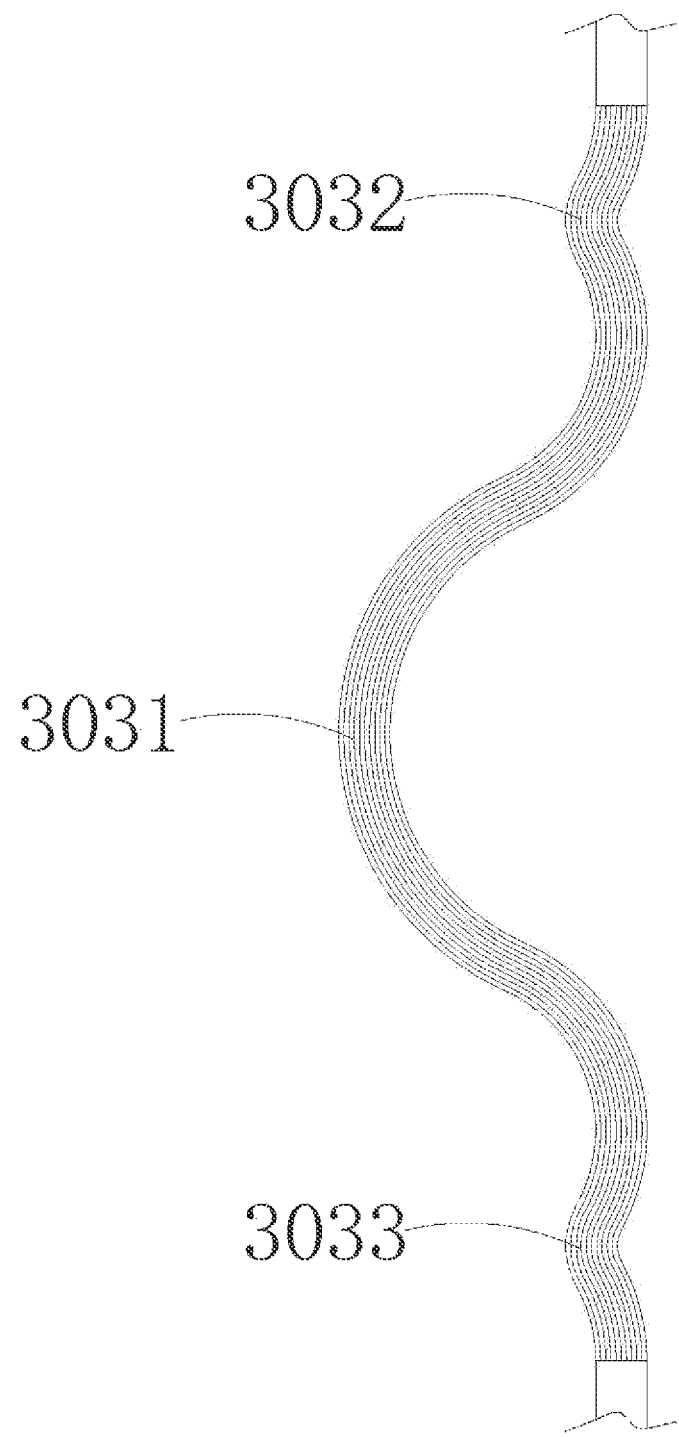
FIG. 14 is a schematic front view of a busbar component according to some embodiments of this application.

As shown in FIG. 14, the flexible bend portion 303 is subjected to a bending process, and the shape may change after the bending process. Therefore, in order to keep consistent shapes of the flexible bend portion 303 and keep consistent shapes of the busbar component 3, a guide portion may be disposed at both ends of the flexible bend portion 303, and the bending process is guided by the guide portion. Therefore, after the bending, the shape of the flexible bend portion 303 keeps consistent, and the shape of the busbar component 3 keeps consistent, thereby ensuring that the structure of the battery 10 meets the design requirements and improving quality of the battery 10.

In some embodiments, the first guide portion 3032 is arc-shaped, and a radius of the first guide portion 3032 is not greater than a radius of the arc portion 3031; and/or the second guide portion 3033 is arc-shaped, and a radius of the second guide portion 3033 is not greater than a radius of the arc portion 3031.

As shown in FIG. 14, with the guide portion being arc-shaped, the guide portion transitions to the arc portion 3031 naturally, thereby improving the guidance effect. The guide portion primarily serves a purpose of guiding the bending of the arc portion 3031. Therefore, the radius of the guide portion may be designed to be relatively small. The deformation of the flexible bend portion 303 is primarily performed through the arc portion 3031. Therefore, the radius of the arc portion 3031 may be designed to be relatively large. Definitely, in a deformation process of the flexible bend portion 303, the guide portion also participates, and serves a function of assisting in the deformation.

In some embodiments, the flexible bend portion 303 is provided with a notch 304, and the flexible bend portion 303 is configured to be bent through the notch 304.

Figure 15:
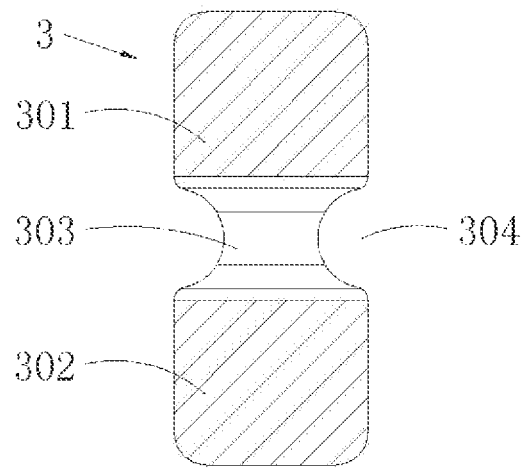
FIG. 15 is a schematic front view of a busbar component according to some embodiments of this application.

As shown in FIG. 15, the notch 304 may be provided on both sides on top of the flexible bend portion 303. By reducing the width of the flexible bend portion 303, the rigidity of the flexible bend portion 303 at the notch 304 is further reduced, and the flexible bend portion 303 is made prone to bend at the notch 304. The notch 304 made on both sides of the flexible bend portion 303 can also form a fuse. The fuse is configured to blow when the busbar component 3 is overcurrent, so that the first connecting portion 301 is disconnected from the second connecting portion 302, and the safety performance of the battery 10 is improved.

In some embodiments, the bending degree of the flexible bend portion 303 is adjustable. In this embodiment, the bending degree is used to represent the curvature of the flexible bend portion 303, and means the curvature in the first direction X. A ratio of a chord height of the flexible bend portion 303 after the bending to a length of the flexible bend portion 303 is the bending degree of the flexible bend portion 303. Specifically, when the opening of the flexible bend portion 303 flares out, the bending degree decreases; and, when the opening of the flexible bend portion 303 tapers off, the bending degree increases. The flexible bend portion 303 is configured to adjust the relative position between the two electrode terminals 4 by adjusting the bending degree.

When the relative position between two adjacent battery cells 2 changes, the bending degree of the flexible bend portion 303 changes adaptively, so as to meet the requirement of electrically connecting the two battery cells 2 arranged at a variety of relative positions. After a plurality of battery cells 2 are connected, the battery cells do not have to be arranged on one plane, but can be arranged on two intersecting planes, for example, in a case that the mounting base inside the vehicle is ramped. The battery cells 2 can quickly adapt to the internal mounting space requirements of different vehicles.

When the vehicle is in operation, vibration occurs inevitably. The vibration is transmitted to the battery cell 2, and exerts a stress on the busbar component 3. To suppress the vibration, the flexible bend portion 303 is elastically deformable. When the battery cell 2 vibrates, the flexible bend portion 303 absorbs the vibration to avoid snapping off under the stress and prevent cracking caused by a long-term stress during the operation. The elastic deformation function of the flexible bend portion 303 is generated by the shape and material of the flexible bend portion. When the vibration occurs, the flexible bend portion 303 is elastically deformable adaptively. The shape of the flexible bend portion 303 is not irreversibly changed after completion of the vibration.

According to a second aspect of embodiments of this application, an electrical device is provided. The electrical device includes the battery 10 described in the first aspect above. The battery 10 is configured to provide electrical energy for the electrical device.

Understandably, the battery 10 described in this embodiment of this application is applicable to various devices that use a battery 10, for example, a mobile phone, a portable device, a notebook computer, an electric power cart, an electric vehicle, a ship, a spacecraft, an electric toy, an electric tool. For example, the spacecraft includes an airplane, a rocket, a space shuttle, a spaceship, and the like. The electric toy includes a fixed or mobile electric toy, such as a game console, an electric car toy, an electric ship toy, an electric airplane toy, and the like. The electric tool includes an electric tool for metal cutting, an electric grinding tool, an electric assembly tool, an electric tool for railways, such as an electric drill, an electric grinder, an electric wrench, an electric screwdriver, an electric hammer, an electric impact drill, a concrete vibrator, and an electric planer.

The battery 10 described in this embodiment of this application is not only applicable to the devices described above, but also applicable to all devices that use the battery 10. However, for brevity, the following embodiment is described by using an electric vehicle as an example.

Figure 16:
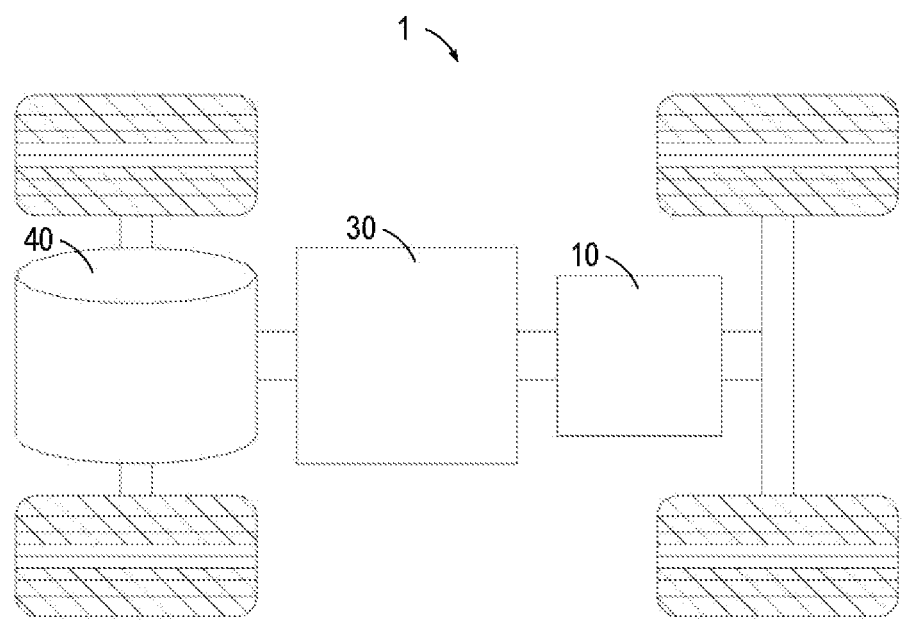
FIG. 16 is a schematic structural diagram of a vehicle powered by a battery disclosed herein according to some embodiments of this application.

For example, refer to FIG. 16, which is a brief schematic view of a vehicle 1 according to an embodiment of this application. The vehicle 1 may be an oil-fueled vehicle, a natural gas vehicle, or a new energy vehicle. The new energy vehicle may be a battery electric vehicle, a hybrid electric vehicle, a range-extended electric vehicle, or the like. As shown in FIG. 16, the battery 10 may be disposed inside the vehicle 1. For example, the battery 10 may be disposed at the bottom, front, or rear of the vehicle 1. The battery 10 may be configured to supply power to the vehicle 1. For example, the battery 10 may serve as an operating power supply of the vehicle 1. In addition, the vehicle 1 may further include a controller 30 and a motor 40. The controller 30 is configured to control the battery 10 to supply power to the motor 40, for example, to start or navigate the vehicle 1, or meet the operating power requirements of the vehicle in operation. In another embodiment of this application, the battery 10 serves not only as an operating power supply of the vehicle 1, but may also serve as a drive power supply of the vehicle 1 to provide driving motive power for the vehicle 1 in place of or partially in place of oil or natural gas.

As shown in FIG. 16, the mounting base inside the vehicle 1 may be ramped. Due to deformability, the busbar component 3 can quickly adapt to the ramped mounting base, thereby facilitating the assembling of the vehicle 1 and improving the production efficiency of the vehicle 1. In addition, the capacity of the battery 10 mounted in the vehicle 1 is increased.

Figure 17:
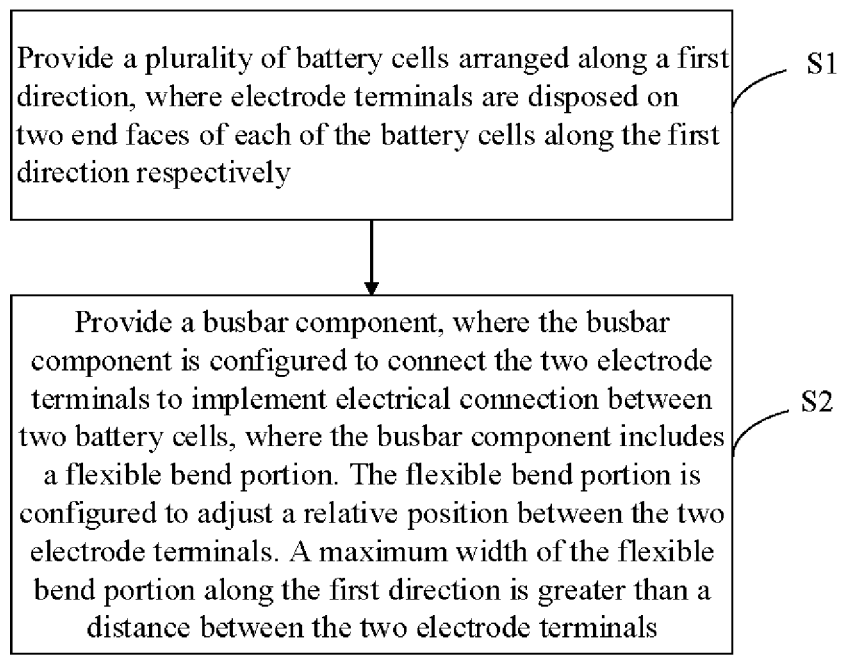
FIG. 17 is a schematic flowchart of a method for manufacturing a battery according to some embodiments of this application.

According to a third aspect of embodiments of this application, a method for manufacturing a battery is further provided. As shown in FIG. 17, the method includes the following steps:

Step S1: Provide a plurality of battery cells 2 arranged along a first direction X, where electrode terminals 4 are disposed on two end faces of each of the battery cells 2 along the first direction X respectively; and Step S2: Provide a busbar component 3, where the busbar component 3 is configured to connect the two electrode terminals 4 to implement electrical connection between two battery cells 2.

The busbar component 3 includes a flexible bend portion 303. The flexible bend portion 303 is configured to adjust a relative position between the two electrode terminals 4. A maximum width of the flexible bend portion 303 along the first direction X is greater than a distance between the two electrode terminals 4.

For information not detailed in this embodiment, refer to the preceding embodiments.

Figure 18:
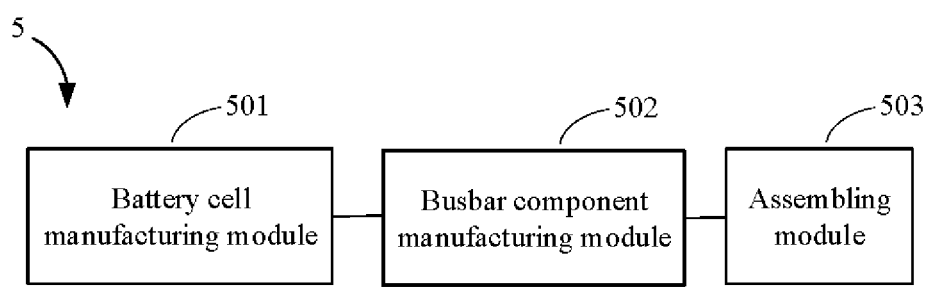
FIG. 18 is a schematic structural diagram of a device for manufacturing a battery according to some embodiments of this application.

According to a fourth aspect of embodiments of this application, a device 5 for manufacturing a battery is further provided. As shown in FIG. 18, the device includes:

a battery cell manufacturing module 501, configured to manufacture a plurality of battery cells 2, where electrode terminals 4 are disposed on two end faces of each of the battery cells 2 along a first direction X respectively;

a busbar component manufacturing module 502, configured to manufacture a busbar component 3, where the busbar component 3 is configured to connect the two electrode terminals 4 to implement electrical connection between two battery cells 2; and an assembling module 503, configured to fixedly connect the busbar component 3 to the two electrode terminals 4.

The busbar component 3 includes a flexible bend portion 303. The flexible bend portion 303 is configured to adjust a relative position between the two electrode terminals 4. A maximum width of the flexible bend portion 303 along the first direction X is greater than a distance between the two electrode terminals 4.

For information not detailed in this embodiment, refer to the preceding embodiments.

Finally, it needs to be noted that the foregoing embodiments are merely intended to describe the technical solutions of this application, but not to limit this application. Although this application is described in detail with reference to the foregoing embodiments, a person of ordinary skill in the art understands that modifications may still be made to the technical solutions described in the foregoing embodiments or equivalent replacements may still be made to some technical features thereof, without making the essence of the corresponding technical solutions depart from the spirit and scope of the technical solutions of the embodiments of this application.

What is claimed is:

1. A battery, comprising:
   two battery cells arranged along a first direction, wherein two adjacent electrode terminals protrude on two adjacent end faces of the two battery cells along the first direction respectively; and
   a busbar structure to connect the two adjacent electrode terminals of the two battery cells arranged along the first direction to implement electrical connection between the two battery cells, wherein, the busbar structure comprises a flexible bend structure, the flexible bend structure adjusts a relative position between the two adjacent electrode terminals, and a maximum width of the flexible bend structure along the first direction is greater than a distance between the two adjacent electrode terminals, and the flexible bend structure is not in contact with the two adjacent end faces of the two battery cells.

2. The battery according to claim 1, wherein the maximum width of the flexible bend structure along the first direction is less than a distance between two adjacent end faces of the two battery cells.

3. The battery according to claim 1, wherein the busbar structure is configured to be bent through the flexible bend structure so that the two adjacent electrode terminals are disposed opposite to each other along the first direction.

4. The battery according to claim 1, wherein the flexible bend structure protrudes from a gap between the two electrode terminals along a second direction, and the second direction is perpendicular to the first direction.

5. The battery according to claim 4, wherein the flexible bend structure does not protrude beyond an outer periphery of the battery cell along the second direction.

6. The battery according to claim 1, wherein the busbar structure comprises:
a first connecting structure to fixedly connect to an electrode terminal of one of the two battery cells; and
a second connecting structure to fixedly connect to an electrode terminal of the other of the two battery cells, wherein
the flexible bend structure connects the first connecting structure and the second connecting structure.

7. The battery according to claim 6, wherein the flexible bend structure comprises a plurality of conductor strips stacked in layers, the first connecting structure and the second connecting structure each comprise a conductor plate, and two ends of each conductor strip are fixedly connected to the conductor plate separately.

8. The battery according to claim 7, wherein a ratio of a thickness of the conductor strip to a thickness of the conductor plate is 1/25 to 1/5.

9. The battery according to claim 6, wherein the busbar structure comprises a plurality of conductor strips stacked in layers, the conductor strips of a preset length at two ends of the busbar structure fit closely with each other to form the first connecting structure and the second connecting structure respectively, and the conductor strips at middle positions of the busbar structure fit closely with each other to form the flexible bend structure.

10. The battery according to claim 6, wherein the flexible bend structure comprises:
an arc structure, located at a middle position of the flexible bend structure;
a first guider to connect the arc structure and the first connecting structure; and
a second guider to connect the arc structure and the second connecting structure, wherein
the first guider and the second guider guide the first connecting structure and the second connecting structure respectively to bend in a case that the flexible bend structure is bent.

11. The battery according to claim 10, wherein the first guider is arc-shaped, and a radius of the first guider is not greater than a radius of the arc structure; and/or
the second guider is arc-shaped, and a radius of the second guider is not greater than a radius of the arc structure.

12. The battery according to claim 1, wherein the flexible bend structure is provided with a notch, and the flexible bend structure is configured to be bent through the notch.

13. The battery according to claim 1, wherein a bending degree of the flexible bend structure is adjustable, and the flexible bend structure is configured to adjust the relative position between the two electrode terminals by adjusting the bending degree.

14. The battery according to claim 1, wherein a cross-sectional shape of the flexible bend structure is an opened circle, an opened rectangle, or an opened ellipse.

15. An electrical device, comprising a battery, wherein the battery is configured to provide electrical energy, and the battery further comprises:
two battery cells arranged along a first direction, wherein two adjacent electrode terminals protrude on two adjacent end faces of the two battery cells along the first direction respectively; and
a busbar structure to connect the two adjacent electrode terminals of the two battery cells arranged along the first direction to implement electrical connection between the two battery cells,
wherein, the busbar structure comprises a flexible bend structure, the flexible bend structure adjusts a relative position between the two adjacent electrode terminals, and a maximum width of the flexible bend structure along the first direction is greater than a distance between the two adjacent electrode terminals, and
the flexible bend structure is not in contact with the two adjacent end faces of the two battery cells.

16. The battery according to claim 1, wherein the maximum width of the flexible bend structure along the first direction is a maximum dimension of an outer contour of the flexible bend structure.

* * * * *